(12) United States Patent
Tanaami et al.

(10) Patent No.: US 11,293,867 B2
(45) Date of Patent: Apr. 5, 2022

(54) BIOCHIP, BIOCHIP UNIT, BIOCHIP READING DEVICE, AND BIOCHIP MANUFACTURING METHOD

(71) Applicant: Yokogawa Electric Corporation, Tokyo (JP)

(72) Inventors: Takeo Tanaami, Tokyo (JP); Tomoyuki Taguchi, Tokyo (JP); Yuki Miyauchi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 334 days.

(21) Appl. No.: 16/479,806

(22) PCT Filed: Jan. 12, 2018

(86) PCT No.: PCT/JP2018/000676
§ 371 (c)(1),
(2) Date: Jul. 22, 2019

(87) PCT Pub. No.: WO2018/142880
PCT Pub. Date: Aug. 9, 2018

(65) Prior Publication Data
US 2021/0325305 A1    Oct. 21, 2021

(30) Foreign Application Priority Data
Feb. 6, 2017  (JP) .............................. JP2017-019163

(51) Int. Cl.
*G01N 21/64*         (2006.01)

(52) U.S. Cl.
CPC ..... *G01N 21/6452* (2013.01); *G01N 21/6456* (2013.01); *G01N 2201/0407* (2013.01); *G01N 2201/0446* (2013.01)

(58) Field of Classification Search
CPC ....... G01N 2021/6478; G01N 21/6452; G01N 27/44721
See application file for complete search history.

(56) References Cited

U.S. PATENT DOCUMENTS

| 6,534,011 B1 | 3/2003 | Karthe et al. |
| 6,686,582 B1 | 2/2004 | Volcker et al. |
| (Continued) | | |

FOREIGN PATENT DOCUMENTS

| JP | 11-173987 A | 7/1999 |
| JP | 2000-019099 A | 1/2000 |
| (Continued) | | |

OTHER PUBLICATIONS

International Search Report for PCT/JP2018/000676 dated Apr. 10, 2018 [PCT/ISA/210].

(Continued)

*Primary Examiner* — David P Porta
*Assistant Examiner* — Fani P Boosalis
(74) *Attorney, Agent, or Firm* — Sughrue Mion, PLLC (57) ABSTRACT

To reduce optical noise in fluorescence measurement. A biochip 110 for fluorescence measurement includes a transparent substrate 111, multiple microlenses 112 dispersively formed on a first surface 111a of the transparent substrate 111, multiple protruding portions 113 formed corresponding one-to-one with the microlenses 112 on a second surface 111b of the transparent substrate 111, and a fluorescence measurement site 114 formed at a top portion of each protruding portion 113.

11 Claims, 8 Drawing Sheets

(56) References Cited

U.S. PATENT DOCUMENTS

| | | | |
|---|---|---|---|
| 8,247,216 B2 | 8/2012 | Zaccarin et al. | |
| 10,175,172 B2* | 1/2019 | Anazawa | G01N 21/6428 |
| 10,215,998 B2* | 2/2019 | Leonberger | G02B 27/58 |
| 2002/0088858 A1 | 7/2002 | Tanaami et al. | |
| 2004/0125370 A1 | 7/2004 | Montagu | |
| 2004/0159798 A1 | 8/2004 | Martin et al. | |
| 2005/0237524 A1 | 10/2005 | Kamei et al. | |
| 2006/0040379 A1 | 2/2006 | Tanaami | |
| 2007/0210269 A1 | 9/2007 | Sonehara et al. | |
| 2013/0114076 A1 | 5/2013 | Schleipen et al. | |
| 2015/0233762 A1 | 8/2015 | Goldring et al. | |
| 2016/0320628 A1 | 11/2016 | Leonberger et al. | |
| 2018/0024061 A1 | 1/2018 | Anazawa et al. | |

FOREIGN PATENT DOCUMENTS

| | | |
|---|---|---|
| JP | 2002-514739 A | 5/2002 |
| JP | 2002-207007 A | 7/2002 |
| JP | 2003-004629 A | 1/2003 |
| JP | 2004-156911 A | 6/2004 |
| JP | 2005-283568 A | 10/2005 |
| JP | 2006-058044 A | 3/2006 |
| JP | 2006-511803 A | 4/2006 |
| JP | 2007-248063 A | 9/2007 |
| JP | 2016-528496 A | 9/2016 |
| WO | 2002/001194 A1 | 1/2002 |
| WO | 2012/004735 A1 | 1/2012 |
| WO | 2016/125244 A1 | 8/2016 |
| WO | 2016/125244 A1 | 11/2016 |
| WO | 2016/178975 A1 | 11/2016 |
| WO | 2017/145230 A1 | 8/2017 |

OTHER PUBLICATIONS

Kunihisa Nagino, "Development of Ultrasensitive DNA Chip by Columnar Structure", Chemical Engineering, 2008, pp. 470-472, vol. 72, Issue 9.

Communication dated Feb. 14, 2022 from the European Patent Office in European Application No. 18 747 577.7.

* cited by examiner

BIOCHIP, BIOCHIP UNIT, BIOCHIP READING DEVICE, AND BIOCHIP MANUFACTURING METHOD

CROSS REFERENCE TO RELATED APPLICATIONS

This application is a National Stage of International Application No. PCT/JP2018/000676, filed on Jan. 12, 2018, which claims priority from Japanese Patent Application No. 2017-019163, filed on Feb. 6, 2017, the entire contents of each of which are herein incorporated by reference in their entireties.

TECHNICAL FIELD

The present invention relates to a fluorescence measurement biochip, a biochip unit, a biochip reading device, and a biochip manufacturing method.

BACKGROUND ART

Typically, a fluorescence measurement biochip provided with multiple sites has been known (see, e.g., Patent Literature 1). Fluorescence measurement using this biochip is performed in such a manner that in a biochip reading device, each site of the biochip is irradiated with excitation light and fluorescence emitted from each site is measured.

Figure 8:
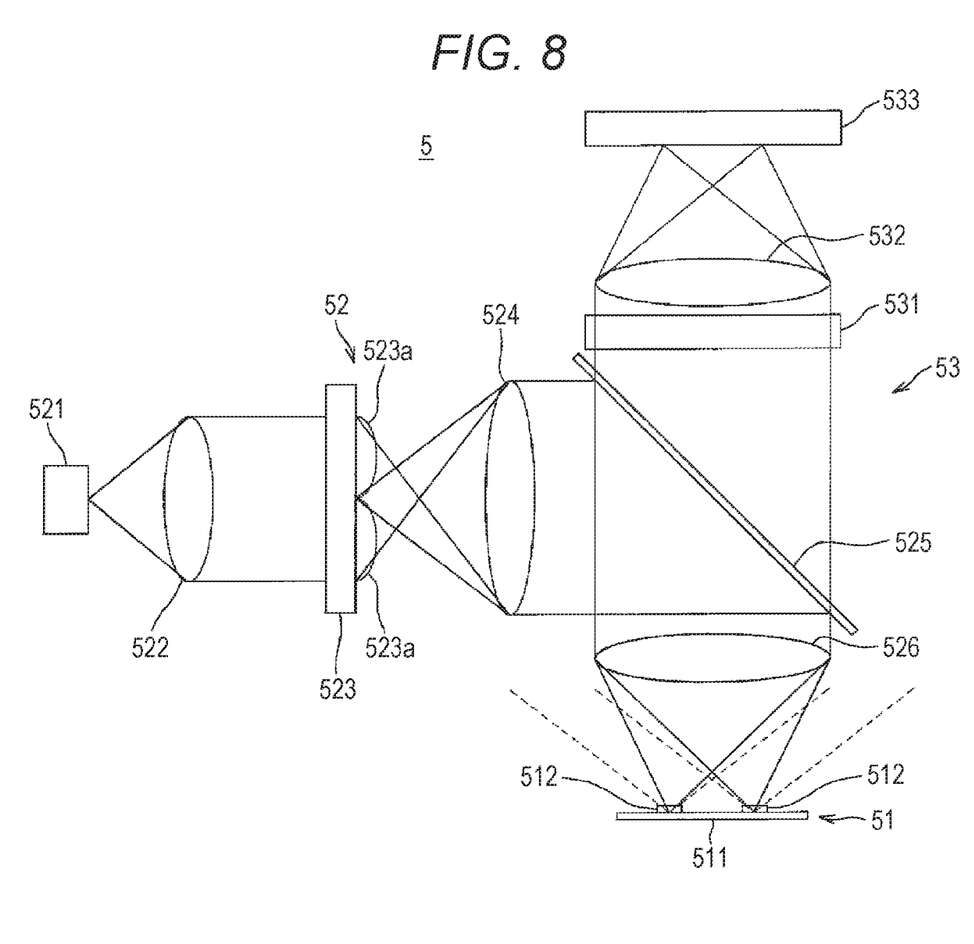
FIG. 8 is a schematic view of one example of a typical biochip reading device.

FIG. 8 is a schematic view of one example of the typical biochip reading device.

A biochip reading device 5 illustrated in FIG. 8 includes a biochip 51, an excitation optical system 52, and an imaging optical system 53 (an image formation side optical system 53). In the biochip reading device 5, the biochip 51 configured such that multiple sites 512 are arranged on a surface of a transparent substrate 511 is used. The site 512 is for fluorescence observation. When the site 512 is dipped in a sample solution, a molecular reaction occurs at the site 512. Upon irradiation with excitation light, fluorescence proportional to the amount of sample in the solution is generated.

First, excitation light output from a light source 521 of the excitation optical system 52 turns into collimated light at a first lens 522, and then, is condensed by a microlens array 523. At the microlens array 523, multiple microlenses 523a are arranged corresponding to arrangement of the multiple sites 512 of the biochip 51. Condensing of the excitation light is performed by each microlens 523a. Thereafter, the excitation light turns into collimated light again at a second lens 524. Such light is reflected on a dichroic mirror 525, and is condensed to the sites 512 by a third lens 526.

When the sites 512 emit fluorescence in response to the excitation light, such fluorescence turns into collimated light at the third lens 526, and passes through the dichroic mirror 525. Then, the light passes through a filter 531 of the imaging optical system 53 (the image formation side optical system 53), and is condensed to an imaging camera 533 by a fourth lens 532. The third lens 526 and the dichroic mirror 525 also serve as optical elements of the imaging optical system 53 (the image formation side optical system 53). The third lens 526 fulfills the role of an objective lens at the imaging optical system 53 (the image formation side optical system 53).

An image of the fluorescence formed on the imaging camera 533 by condensing at such an imaging optical system is captured, and fluorescence images at the multiple sites 512 can be obtained at once without optical scanning. Such fluorescence measurement by the biochip reading device 5 is broadly used for, e.g., analysis of a gene group regarding a certain phenomenon, measurement of the amount of expression of many genes, and gene expression profile.

A biochip configured such that fluorescence measurement sensitivity is improved by an increase in the amount of excitation light and efficient fluorescence condensing has been proposed herein (see, e.g., Patent Literature 2).

Figure 9:
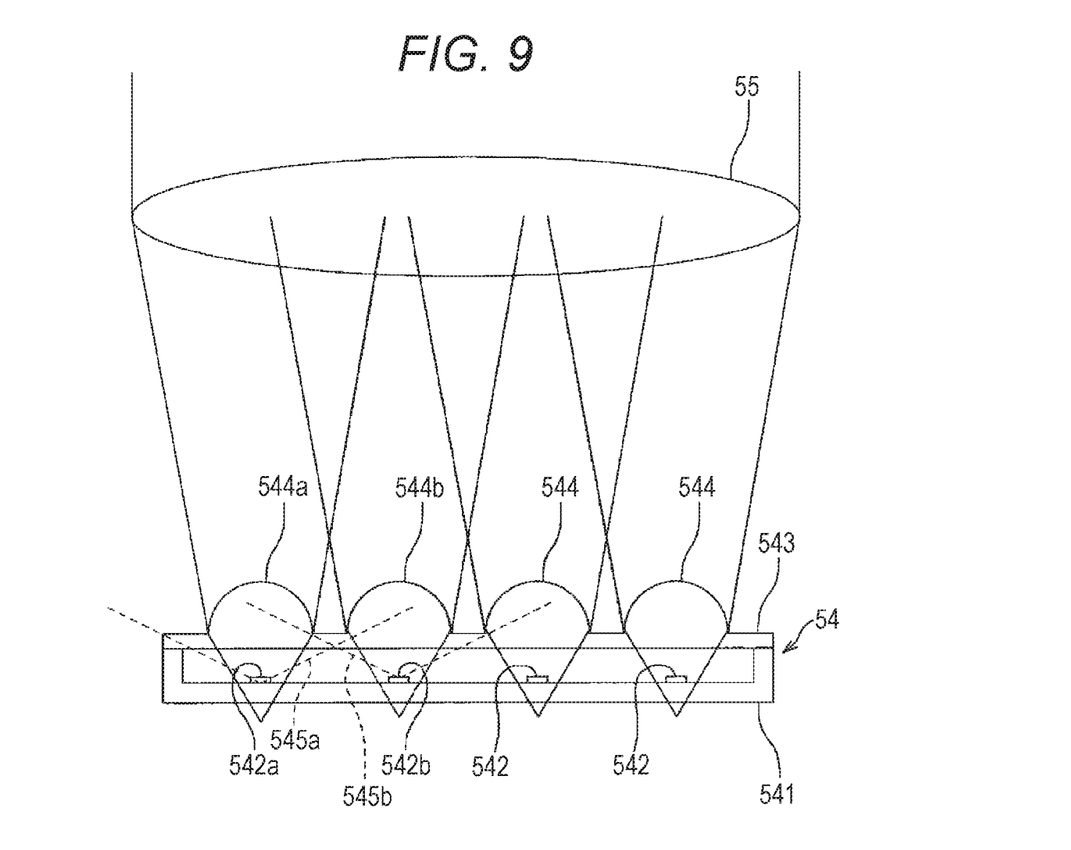
FIG. 9 is a schematic view of one example of a typical biochip configured such that fluorescence measurement sensitivity is improved by an increase in the amount of excitation light and efficient fluorescence condensing.

FIG. 9 is a schematic view of one example of a typical biochip configured such that fluorescence measurement sensitivity is improved by an increase in the amount of excitation light and efficient fluorescence condensing.

In a biochip 54 illustrated in FIG. 9, multiple sites 542 are arranged on a bottom surface of a container 541 in which a sample solution as a measurement target is sealed. Moreover, multiple microlenses 544 are, on an outer surface of a transparent substrate 543 covering the container 541, arranged corresponding one-to-one with the multiple sites 542. In an excitation optical system of a biochip reading device using the biochip 54, a microlens array as illustrated in FIG. 8 is not necessary.

Excitation light is condensed by an objective lens 55, and is further condensed toward the sites 542 by the microlenses 544. In the biochip reading device 5 illustrated in FIG. 8, after condensing at the microlens array 523, a loss might be caused in excitation light because a numerical aperture is small due to a long distance to the site 512. On the other hand, in the biochip 54 illustrated in FIG. 9, the microlenses 544 are provided close to the sites 542, and therefore, the amount of excitation light increases. Moreover, in the biochip 54, fluorescence of each site 542 is condensed at the microlens 544, and then, heads to the objective lens 55. Thus, efficient fluorescence condensing is also realized.

For improvement of fluorescence measurement sensitivity, a biochip configured such that a site shape is stabilized has been proposed (see, e.g., Non-Patent Literature 1).

Figure 10:
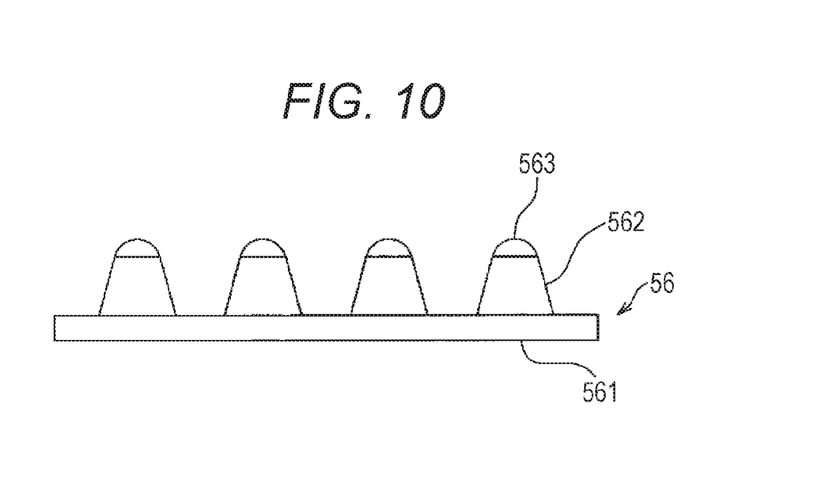
FIG. 10 is a schematic view of one example of a typical biochip configured such that a site shape is stabilized.

FIG. 10 is a schematic view of one example of a typical biochip configured such that a site shape is stabilized.

A biochip 56 illustrated in FIG. 10 is configured such that multiple protruding portions 562 are formed on a surface of a transparent substrate 561 and a site 563 is formed at a top portion of each protruding portion 562. In the biochip 56, a formation location of the site 563 is limited to the top portion of the protruding portion 562. Thus, the formation position and shape of each site 563 are stabilized, and variation in the site 563 is reduced.

CITATION LIST

Patent Literature

PATENT LITERATURE 1: JP-A-2002-207007
PATENT LITERATURE 2: JP-A-2006-058044
NON-PATENT LITERATURE 1: "Development of Ultra-sensitive DNA Chip by Columnar Structure," Chemical Engineering Volume 72 Issue 9, p 470 to p 472, 2008

SUMMARY OF THE INVENTION

Problems to be Solved by the Invention

Fluorescence emitted from the site of the biochip described above has an extremely-wide divergence angle. Thus, fluorescence of a certain site might be optical noise in fluorescence measurement, such as stray light or crosstalk, for fluorescence of another site. For example, in FIG. 9, fluorescence 545a generated from a first site 542a from the left enters an adjacent microlens 544b. Similarly, fluorescence from a second site 542b from the left enters an adjacent microlens 544a. Such incident fluorescence becomes stray light or crosstalk through the objective lens 55. Such optical noise lowers the accuracy of fluorescence measurement, and therefore, is preferably reduced as much as possible.

The present invention has been made in view of the above-described situation, and is intended to provide a biochip, a biochip unit, a biochip reading device, and a biochip manufacturing method configured so that optical noise in fluorescence measurement can be reduced.

Solution to the Problems

For solving the above-described problems, the biochip of the present invention is a biochip for fluorescence measurement. The biochip includes a transparent substrate, multiple microlenses formed in an array on a first surface of the transparent substrate on an excitation light irradiation side, multiple protruding portions formed corresponding one-to-one with the microlenses on a second surface of the transparent substrate, and a fluorescence measurement site formed at a top portion of each protruding portion.

In the biochip of the present invention, the conical angle of a side surface of each protruding portion may be equal to or greater than the aperture angle of each microlens.

Moreover, in the biochip of the present invention, the side surface of each protruding portion may totally reflect at least part of fluorescence emitted from the site and passing through the inside of each protruding portion toward each microlens.

Further, in the biochip of the present invention, in a plane including the optical axis of one of the microlenses most adjacent to the optical axis of another one of the microlenses facing an optional one of the sites, the conical angle of the side surface of each protruding portion may be smaller than an angle between a line connecting, with a shortest distance, an end portion of the site and a boundary between the most adjacent microlens and a flat surface of the first surface and the optical axis of the microlens facing the optional one of the sites.

For solving the above-described problems, the biochip unit of the present invention is a biochip unit including a biochip for fluorescence measurement and a biochip support container. The biochip is the above-described biochip of the present invention. The support container hermetically seals the second surface of the transparent substrate together with the multiple sites, and a sample solution for fluorescence measurement is sealed in the support container such that the sites are dipped in the sample solution.

Moreover, in the biochip unit of the present invention, the sample solution may be a black solution.

Further, in the biochip unit of the present invention, the site may be nucleic acid hybridization or an antigen-antibody reaction molecular reaction site.

For solving the above-described problems, the biochip reading device of the present invention is a biochip reading device including a biochip for fluorescence measurement and provided for reading fluorescence from the biochip, the biochip being the above-described biochip of the present invention. The biochip reading device includes an excitation optical system configured to irradiate the sites of the biochip with excitation light from a microlens side, and an imaging optical system configured to condense fluorescence emitted from each site and having passed through each microlens by a photo-receiving optical system to image the fluorescence by a photo-receiving element.

Moreover, in the biochip reading device of the present invention, the aperture angle of each microlens on a photo-receiving optical system side may be greater than the aperture angle of the photo-receiving optical system on a biochip side. In other words, in the biochip reading device of the present invention, the numerical aperture of the photo-receiving optical system may be smaller than the numerical aperture of the microlens.

For solving the above-described problems, the biochip manufacturing method of the present invention is a biochip manufacturing method for manufacturing a biochip for fluorescence measurement, the biochip being the above-described biochip of the present invention. The biochip manufacturing method includes the application step of preparing a well container configured such that a probe solution for forming the sites is accumulated in each of multiple recessed portions arranged facing the second surface of the transparent substrate and formed corresponding one-to-one with the protruding portions and applying the probe solution to the top portions of the protruding portions in such a manner that the protruding portions each enter the recessed portions of the well container and the top portions are drawn up after having been dipped in the probe solution, and the drying step of drying the protruding portions having the top portions to which the probe solution has been applied to fix probes of the probe solution to the top portions and form the sites.

Moreover, in the biochip manufacturing method, the coating step of forming an active functional group for fixing the probes by surface treatment for the second surface including the protruding portions may be performed in advance of the application step.

Further, in the biochip manufacturing method, the blocking step of dipping the second surface including the protruding portions in a blocking solution for deactivating the active functional group to deactivate an unreacted active functional group at other spots than site formation spots may be performed after the drying step.

Effects of the Invention

According to the present invention, the site is provided at each top portion of the multiple protruding portions formed corresponding one-to-one with the microlenses. Fluorescence emitted from the site heads to the microlens through the inside of the protruding portion. Thus, when part of fluorescence having a wide divergence angle at a certain site heads to an adjacent microlens, such fluorescence is reflected on the inside of the side surface of the protruding portion, and stray light and crosstalk for fluorescence of an adjacent site are reduced. As described above, according to the present invention, optical noise in fluorescence measurement can be reduced.

DESCRIPTION OF EMBODIMENTS

Hereinafter, an embodiment of the present invention will be described with reference to the drawings.

Figure 1:
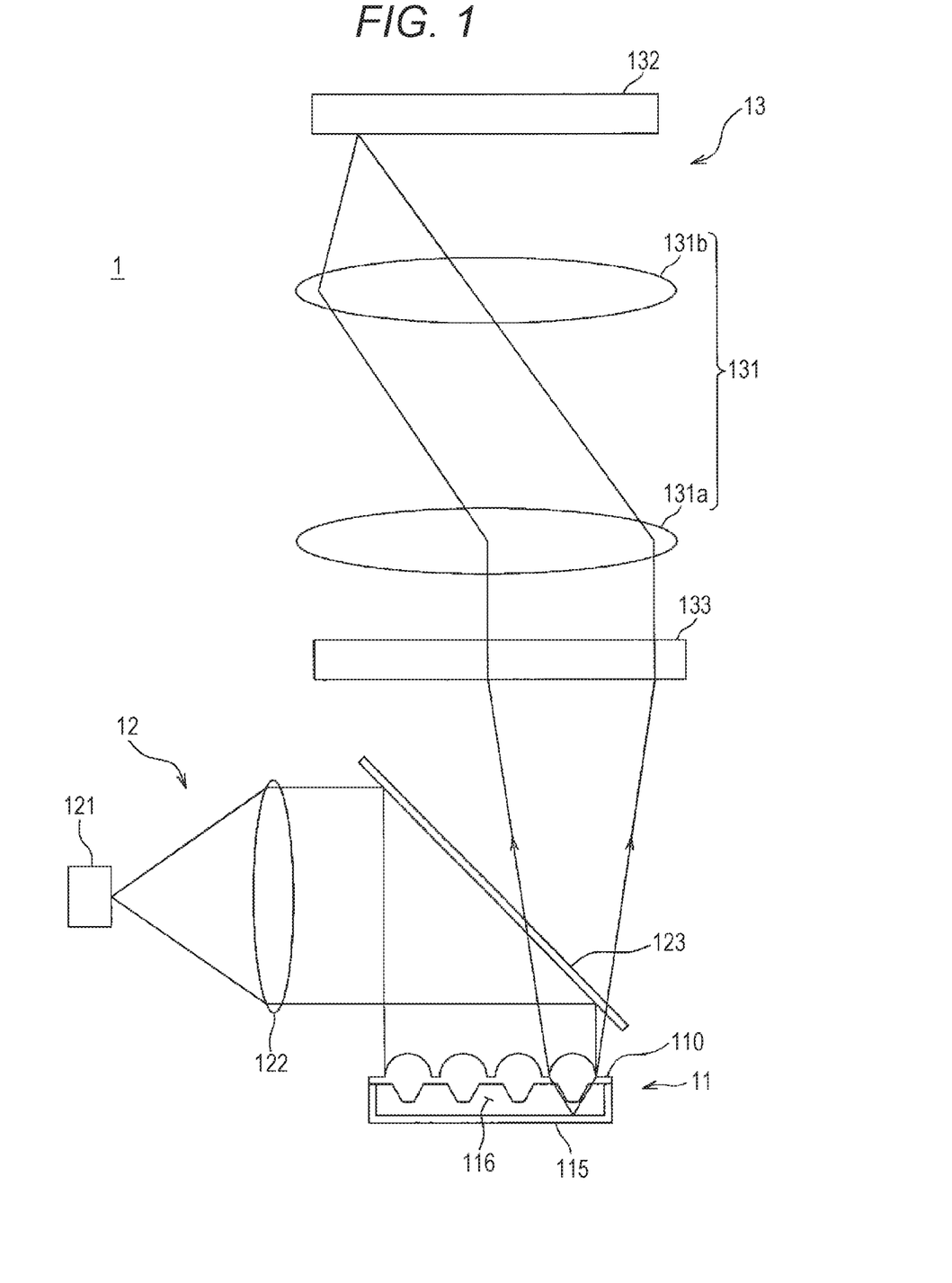
FIG. 1 is a schematic view of a biochip reading device according to one embodiment of the present invention.

FIG. 1 is a schematic view of a biochip reading device according to one embodiment of the present invention.

The biochip reading device 1 illustrated in FIG. 1 is a device including a fluorescence measurement biochip 110 and configured to read fluorescence from the biochip 110. The biochip 110 and a support container 115 in which a fluorescence measurement sample solution 116 is sealed form a biochip unit 11 together. Note that in the present embodiment, a black solution for reducing background light in fluorescence measurement is employed as the sample solution 116.

The biochip reading device 1 includes the biochip unit 11, an excitation optical system 12, and an imaging optical system 13.

The excitation optical system 12 includes a light source 121, an excitation lens 122, and a dichroic mirror 123. Excitation light output from the light source 121 turns into collimated light at the excitation lens 122, and is reflected on the dichroic mirror 123. Then, the biochip unit 11 is irradiated with such light. The dichroic mirror 123 also serves as an optical element of the imaging optical system 13. Note that a laser light source is used as the light source 121 so that a sharp excitation wavelength band with a great excitation light amount and less leak to a fluorescence wavelength can be realized. On the other hand, when final performance conditions permit, e.g., an inexpensive LED or halogen lamp can be used in combination with an excitation wavelength filter.

The imaging optical system 13 includes the dichroic mirror 123, a relay lens 131 having a first lens 131a and a second lens 131b, an imaging camera 132, and a barrier filter 133. Fluorescence generated at the biochip unit 11 in response to excitation light passes through the dichroic mirror 123, and is condensed to the imaging camera 132 by the relay lens 131 as a photo-receiving optical system. An image of the fluorescence formed on the imaging camera 132 by the relay lens 131 is captured. Note that for reducing light amount distribution and image distortion across a wide area of the biochip 110, the relay lens 131 serves as a telecentric optical system. Moreover, for obtaining an accurate imaging relationship, the dichroic mirror 123 and the barrier filter 133 are preferably added as a broad-sense photo-receiving optical system to calculate a focal position and an aberration.

In the present embodiment, in addition to these illustrated components, a computer configured to control the imaging camera 132 and analyze a captured image to calculate a fluorescent light amount and a recording device configured to record a captured image and a calculation result are, for example, also provided. Moreover, the imaging camera 132 may preferably include, as a photo-receiving element, a color/black-and-white CCD/CMOS camera and an EM-CCD or a digital CMOS allowing highly-sensitive imaging. Alternatively, the imaging camera 132 may be, for example, the group of single detector PDs corresponding one-to-one with later-described multiple sites in the biochip unit 11.

The biochip reading device 1 described above is, for example, applied to dry image measurement by fluorescence intensity measurement in a DNA chip method and in-liquid measurement and real-time measurement of fluorescence intensity in the biochip unit 11.

Moreover, the biochip reading device 1 is also applied to the following solid-phase method such as a labeled antibody method used for a clinical examination and the like. For example, a FISH method (fluorescence in situ hybridization) for fluorescence-measuring expression of a specific chromosome or gene in a tissue or a cell by means of a fluorescent material is one example. In addition, examples include applications to the following various methods. That is, the examples include an FIA method (fluoroimmunoassay) for measuring an antigen-antibody reaction by means of a fluorescence emission substance, such as europium, as a label, and a IFA method (an indirect fluorescent antibody method) for measuring a reaction between a serum (an antibody) labeled with a fluorescent material and, e.g., a disease agent as an antigen. Further, the examples further include applications to identification of bacterial species by gene/polymer analysis and examination for a cancer gene, identification of animals and plants, and intestinal bacteria.

The biochip unit 11 provided at the biochip reading device 1 includes, as described above, the fluorescence measurement biochip 110 and the support container 115. The fluorescence measurement sample solution 116 in various application examples described above is sealed in the support container 115.

Figure 2:
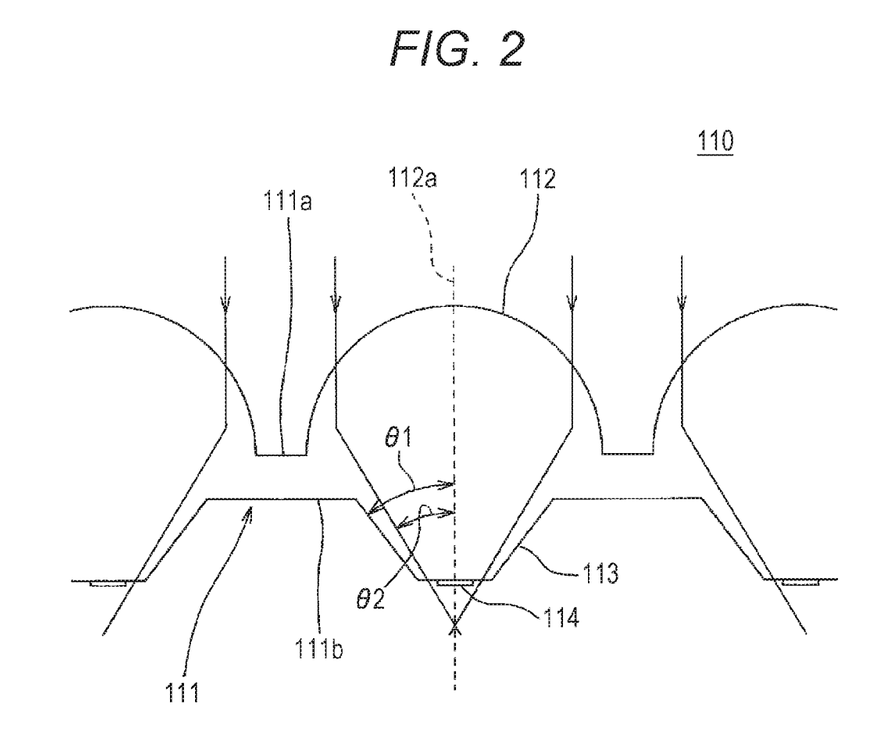
FIG. 2 is an enlarged view of a biochip illustrated in FIG. 1.

FIG. 2 is an enlarged view of the biochip illustrated in FIG. 1.

The biochip 110 includes a transparent substrate 111, multiple microlenses 112, multiple protruding portions 113, and sites 114. The multiple microlenses 112 are formed in an array on a first surface 111a of the transparent substrate 111 as an excitation light irradiation side. Each microlens 112 is a spherical lens formed in a hemispherical shape. The multiple protruding portions 113 are formed corresponding one-to-one with the microlenses 112 on a second surface 111b of the transparent substrate 111 as a molecular reaction site side opposite to the first surface 111a. Each protruding portion 113 has a frusto-conical shape about an optical axis 112a of the microlens 112 as a center axis. The molecular reaction site 114 is, as viewed in plane, formed substantially in a circular shape on a flat top portion of the frusto-conical protruding portion 113.

The transparent substrate 111, the microlenses 112, and the protruding portions 113 in the biochip 110 are integrally made of the following material. That is, glass, silicon, a single crystal, transparent ceramics, and a resin material are suitable as the formation material. The resin material includes, for example, COP (cyclo olefin polymer) exhibiting excellent optical characteristics and chemical/thermal stability and polycarbonate, acrylic-based resin, and polyethylene resin utilized for a resin lens.

A fluorescent pigment forming the site 114 includes the following pigments. For example, the luminescent pigments include FITC having an excitation wavelength of 490 nm and an emission wavelength of 520 nm, and Phycoerythrin having an excitation wavelength of 488 nm and an emission wavelength of 570 nm. Further, the luminescent pigments include Cy3 having an excitation wavelength of 550 nm and an emission wavelength of 570 nm, and Cy5 having an excitation wavelength of 649 nm and an emission wavelength of 670 nm. In addition, the luminescent pigments include Alexa Fluor (the registered trademark) 488 having an excitation wavelength of 495 nm and an emission wavelength of 519 nm, and Alexa Fluor (the registered trademark) 555 having an excitation wavelength of 555 nm and an emission wavelength of 565 nm. Moreover, the luminescent pigments include Alexa Fluor (the registered trademark) 647 having an excitation wavelength of 650 nm and an emission wavelength of 665 nm. The molecular reaction site using these fluorescent pigments is designed such that a fluorescent light intensity increases proportional to a sample amount, for example.

The fluorescent pigment forming the site 114 is selected according to a fluorescence measurement application, and the microlens 112 is designed according to the excitation wavelength of the selected fluorescent pigment.

In the biochip 110, the focal point of the microlens 112 is set to an optical axis position on a far side with respect to the site 114. As a result, excitation light is in a defocus state at the site 114, and an irradiation area is wide. In the present embodiment, the irradiation area is an area corresponding to the outer diameter of the site 114. Thus, the site 114 is irradiated with all of excitation light from the microlens 112. Contact of excitation light with an unnecessary spot around the site 114 can be prevented, and background light can be reduced.

Excitation light with which the site 114 is irradiated increases due to a condensing effect of the microlens 112. Moreover, irradiation light for other spots than the site greatly decreases. The amount of excitation light for the site 114 is proportional to an area ratio between a lens effective area and the irradiation area. Thus, when a lens effective diameter is, for example, 1.0 mm and an irradiation surface diameter is 0.2 mm, the light amount is $1.0^2/0.2^2 = 25$ times. In this state, the conical angle $\theta 1$ of a side surface of the protruding portion 113 is greater than the aperture angle $\theta 2$ of the microlens 112 such that a condensing optical path of the microlens 112 is not on an inner portion of the side surface of the protruding portion 113. Note that in this case, an angle between a line connecting the focal point on the optical axis and the outer periphery of the lens effective area corresponding to a boundary between the lens and a flat surface and the optical axis in a plane including the optical axis of the lens will be referred to as a lens aperture angle ($\theta 2$ in FIG. 2). Moreover, an angle between the optical axis 112a of the lens and the side surface of the protruding portion 113 in the same plane will be referred to as a conical angle ($\theta 1$ in FIG. 2).

Fluorescence emitted by the site 114 excited with excitation light heads to the first lens 131a (a chip-side lens) of the relay lens 131 closest to the biochip 110 along the following optical path. Note that in FIG. 1, the first lens 131a is illustrated as a single lens, but may be a lens group including multiple lenses arranged on the optical axis. The same also applies to other lenses forming the excitation optical system 12 and the imaging optical system 13.

Figure 3:
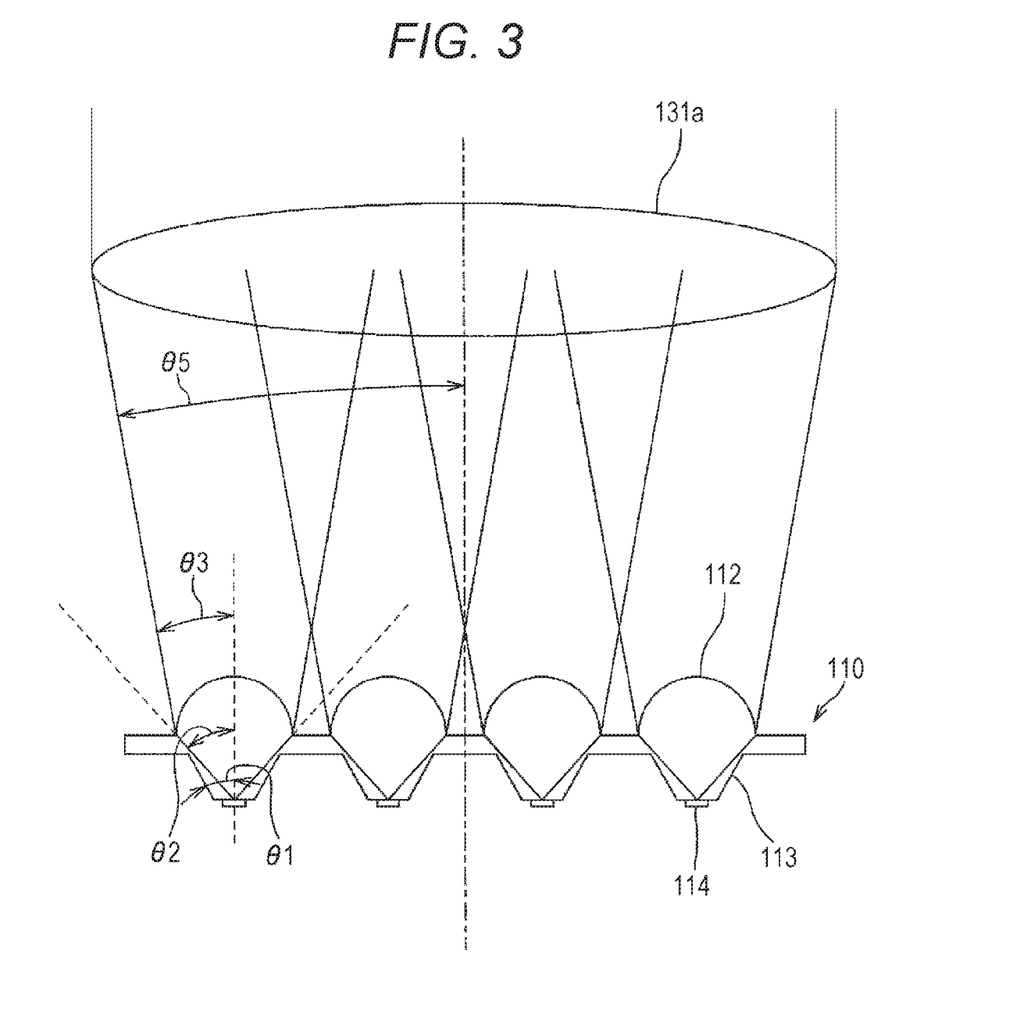
FIG. 3 is a schematic view of an optical path in which fluorescence emitted from a site heads to a first lens of a relay lens.

FIG. 3 is a schematic view of the optical path of fluorescence emitted by the site toward the first lens of the relay lens. Note that in FIG. 3, the dichroic mirror 123 and the barrier filter 133 arranged between the biochip 110 and the first lens 131a are not shown.

Fluorescence emitted by the site 114 passes through the inside of the protruding portion 113, and heads to the microlens 112. The fluorescence is condensed to the first lens 131a by the microlens 112. At this point, in the present embodiment, the aperture angle $\theta 2$ of the microlens 112 on a fluorescence incident side is greater than the aperture angle $\theta 3$ of the microlens 112 on a fluorescence emission side.

A great amount of fluorescence emitted with a wide divergence angle from the site 114 is condensed by the microlens 112 having a great aperture angle $\theta 2$ as described above. When the site 114 is the focal point of the microlens 112, light emitted from the microlens 112 to the first lens 131a is collimated light, but the site 114 is at a defocus position. Thus, light emitted from the microlens 112 is at such an angle that the light slightly opens from the collimated light, such as the aperture angle $\theta 3$ on the fluorescence emission side. That is, fluorescence generated with a wide divergence angle from the site 114 and having entered the microlens 112 with the aperture angle $\theta 2$ on the fluorescence incident side is converted into one with the fluorescence-emission-side aperture angle $\theta 3$ as a narrow angle, and therefore, high-efficiency fluorescence condensing is allowed. This is because in a case where the aperture angle $\theta 5$ of the first lens 131a is smaller than the divergence angle from the site 114, fluorescence from the site 114 causes a loss at a great-aperture-angle portion of the first lens 131a as indicated by dashed lines, but such a loss can be improved by aperture angle conversion from the aperture angle $\theta 2$ on the fluorescence incident side into the aperture angle $\theta 3$ on the fluorescence emission side by the microlens 112. Note that a smaller aperture angle $\theta 5$ of the first lens 131a than the aperture angle $\theta 2$ of the microlens 112 on the fluorescence incident side is important for ensuring a wide field of view for simultaneously measuring the multiple sites 114. The effect of increasing the amount of light condensed by the microlens 112 is proportional to the ratio of the square of a numerical aperture NA at each lens. For example, when a numerical aperture corresponding to an emission angle (i.e., the aperture angle $\theta 3$ on the fluorescence emission side) from the microlens 112 is 0.2 and a numerical aperture corresponding to the aperture angle $\theta 2$ (i.e., the emission angle of the site 114) of the microlens 112 on the fluorescence incident side is 0.6, the light amount increases to $0.6^2/0.2^2 = 9$ times.

Figure 4:
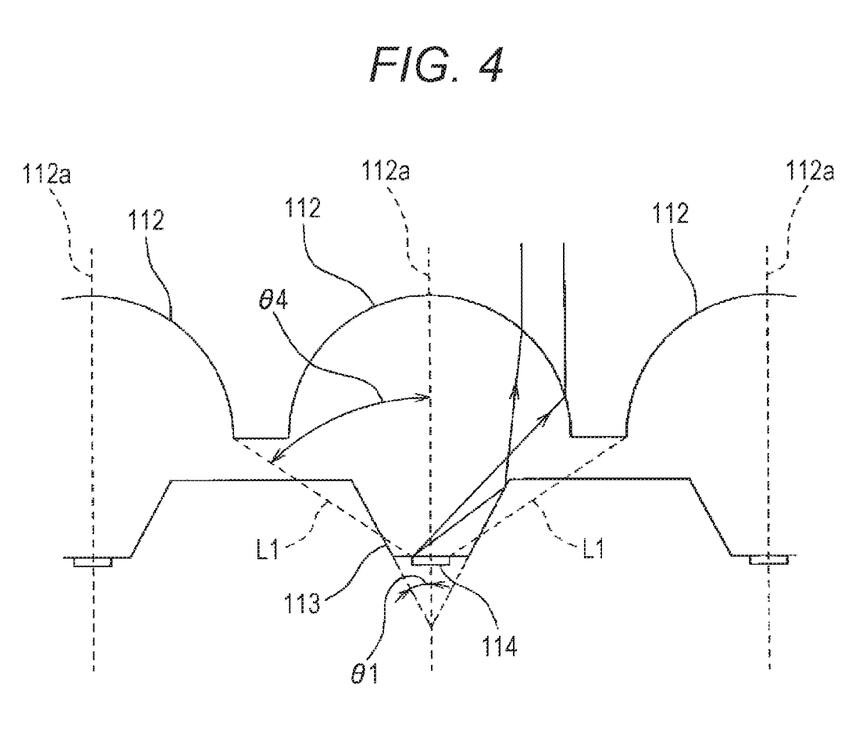
FIG. 4 is a schematic view in a state in which fluorescence from the site heads to a microlens through the inside of a protruding portion.

FIG. 4 is a schematic view in a state in which fluorescence emitted from the site heads to the microlens through the inside of the protruding portion.

Part of the fluorescence directly heads to the inside of the microlens 112 through the inside of the protruding portion 113. Moreover, another part of the fluorescence is reflected on the side surface of the protruding portion 113 to head to the inside of the microlens 112. At this point, in the present embodiment, it is configured such that the side surface of the protruding portion 113 totally reflects at least part of the fluorescence emitted from the site 114 and passing through the inside of the protruding portion 113. Conditions for such total reflection are the following conditions known as a so-called Snell's law.

That is, total reflection occurs when an angle between the fluorescence and the normal of the side surface of the protruding portion 113 is an angle of equal to or greater than arcsin (n2/n1), n1 being the refractive index of the formation material of the protruding portion 113 and n2 being a refractive index outside the protruding portion 113. Of the fluorescence, fluorescence satisfying these conditions is totally reflected on the side surface of the protruding portion 113, and heads to the inside of the microlens 112. These conditions can be easily realized when the biochip is resin or glass (n1≈1.5) and the sample solution is a water solution (n2≈1.3).

It is configured such that total reflection occurs for part of the fluorescence as described above, therefore, fluorescence is collected to the microlens 112 even from the outside of the original aperture angle. This seems that the aperture angle is expanded. An increase in the amount of light condensed by the microlens 112 is proportional to a ratio between the square of the numerical aperture NA1 of the microlens 112 and the square of the corrected numerical aperture NA1' of the microlens 112 due to the protruding portion 113. For example, when the numerical aperture NA1 of the microlens 112 is 0.6 and the corrected numerical aperture NA1' is 1.0, the light amount increases to $1.0^2/0.6^2=2.7$ times.

Moreover, in the present embodiment, the conical angle θ1 of the side surface of the protruding portion 113 is also the following angle. First, as illustrated in FIG. 4, a plane including an optional site 114 and the optical axis 112a of the microlens 112 most adjacent to the optical axis 112a of the microlens 112 condensing excitation light to such an opposing optional site is assumed. In this plane, an angle θ4 between a line L connecting, with a shortest distance, an outermost end portion of the site 114 and a boundary between the above-described most adjacent microlens 112 and a flat surface of the first surface 111a and the optical axis 112a of the microlens 112 facing the site 114 is focused. In the present embodiment, the conical angle θ1 of the side surface of the protruding portion 113 is smaller than the angle θ4. Thus, almost all of fluorescence emitted by each site 114 deviates from an optical path toward the adjacent microlens 112.

An increase in the amount of excitation light by the microlens 112, an increase in the amount of condensed fluorescence by the microlens 112, and an increase in the amount of condensed fluorescence by the corrected numerical aperture NA1' due to the protruding portion 113 have been described so far. With these configurations, in the entirety of the biochip reading device 1 of the present embodiment, a light amount increase and stray light reduction in fluorescence measurement per site 114 as described later can be expected.

Figure 5:
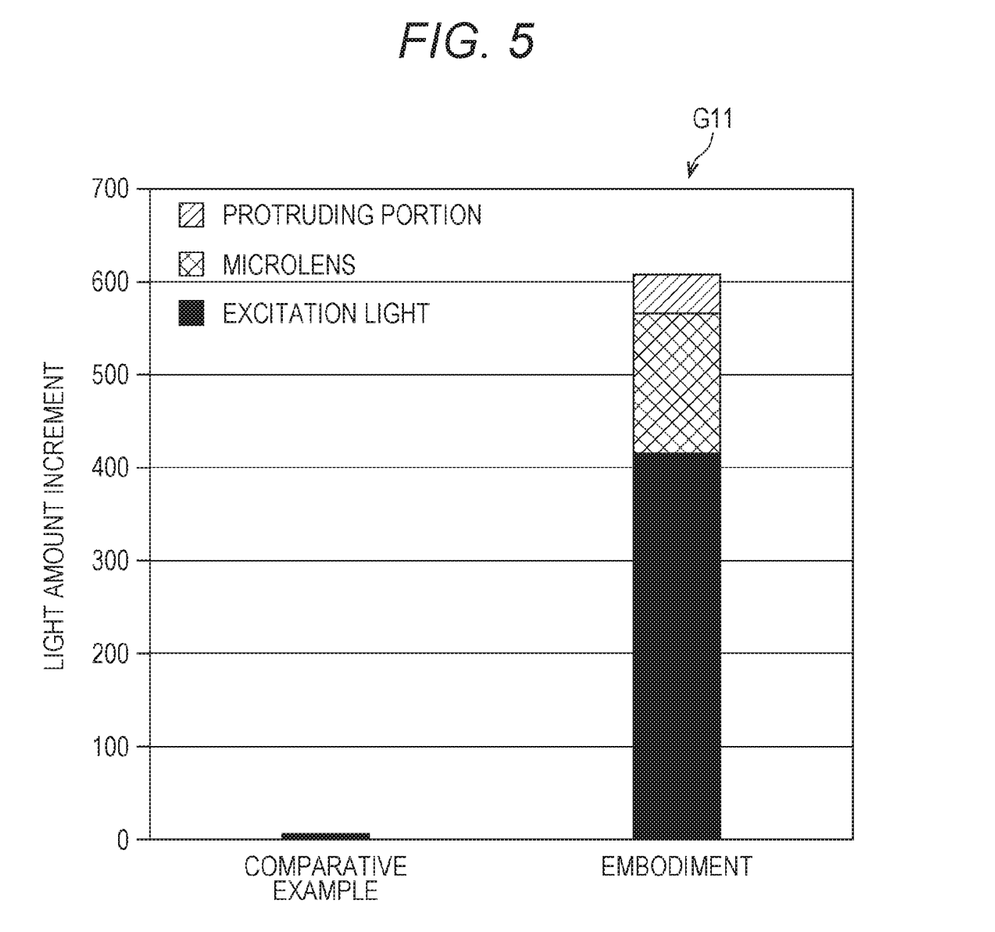
FIG. 5 is a bar graph of a light amount increase in fluorescence measurement per site.

FIG. 5 is a bar graph of a light amount increase in fluorescence measurement per site. Note that FIG. 5 illustrates, as a comparative example, a light amount increase in fluorescence measurement per site 512 in a typical biochip reading device 5 described with reference to FIG. 8.

In a graph G11 illustrated in FIG. 5, the horizontal axis represents the comparative example and the present embodiment, and the vertical axis represents a light amount increment.

As described above, in the above-described calculation example in the present embodiment, an increase in the amount of excitation light by the microlens 112 is 25 times, an increase in the amount of fluorescence condensed by the microlens 112 is 9 times, and an increase in the amount of fluorescence condensed by the protruding portion 113 is 2.7 times. As a result, a fluorescence amount increase of 607 times can be expected as an entire light amount increase as compared to the comparison example. Note that in a structure of FIG. 9, no measurements are taken against stray light, and therefore, no comparison is made.

According to the biochip 110 of the present embodiment described above, the site 114 is provided at each top portion of multiple protruding portions 113 formed corresponding one-to-one with the microlenses 112. Fluorescence emitted from the site 114 heads to the microlens 112 through the inside of the protruding portion 113. Thus, when part of fluorescence having a wide divergence angle at a certain site 114 heads to an adjacent microlens 112, such fluorescence is reflected on the inside of the side surface of the protruding portion 113, and stray light and crosstalk for fluorescence detection of the adjacent site 114 are reduced. As described above, according to the biochip 110 of the present embodiment, optical noise in fluorescence measurement can be reduced.

Moreover, in the biochip 110 of the present embodiment, the conical angle θ1 of the side surface of the protruding portion 113 is greater than the aperture angle θ2 of the microlens 112. Thus, the site 114 can be irradiated with excitation light without scattering of the excitation light due to contact with the side surface of the protruding portion 113, and therefore, the optical noise can be further reduced. Moreover, the light amount measured for each site 114 can be increased by efficient light condensing as described above, and the accuracy of fluorescence measurement can be enhanced.

Further, in the biochip 110 of the present embodiment, the side surface of the protruding portion 113 is configured to totally reflect at least part of fluorescence emitted from the site 114 and passing through the inside of the protruding portion 113 toward the microlens 112. A condensing efficiency can be further improved by total reflection on the inside of the side surface of the protruding portion 113. That is, fluorescence is also collected to each microlens 112 from the outside of the original aperture angle θ2 due to such total reflection, and this seems that the aperture angle is expanded. Thus, the measured light amount can be further increased, and the accuracy of fluorescence measurement can be further enhanced.

In addition, in the biochip 110 of the present embodiment, the conical angle θ1 of the side surface of the protruding portion 113 is also the following angle. First, a plane including the optional axis 112a of a microlens 112 facing an optional site 114 and the optional axis 112a of an adjacent microlens 112 is assumed. In this plane, the conical angle θ1 is smaller than the angle θ4 between the line L1 connecting, with the shortest distance, the end portion of the site 114 and the boundary between the above-described most adjacent microlens 112 and the flat surface of the first surface 111a and the optical axis 112a of the microlens 112 facing the site 114. Thus, almost all of fluorescence emitted from each site 114 deviates from the optical path toward the adjacent microlens 112, and therefore, the optical noise can be further reduced. With this configuration, an interval between the microlenses 112 can be narrowed to some extent, and therefore, high-density integration of the biochip 110 can be realized.

Moreover, the biochip unit 11 of the present embodiment is configured such that the support container 115 hermetically seals the second surface 111b of the transparent substrate 111 together with the multiple sites 114. Further, the fluorescence measurement sample solution 116 is sealed in the support container 115 without leaking to the outside, and the sites 114 are dipped in the sample solution 116. According to the biochip unit 11, stray light and crosstalk for fluorescence of an adjacent site 114 are reduced in the biochip 110 of the present embodiment. Thus, the optical noise in fluorescence measurement can be reduced.

Further, in the biochip unit 11 of the present embodiment, the black solution is employed as the sample solution 116 in the support container 115. The black solution absorbs stray light other than fluorescence and crosstalk light from an adjacent site. The site is directly joined to the microlens, and therefore, the light from the site heads to the reading device without passing through the black solution. Thus, background light in fluorescence measurement can be reduced, and therefore, the optical noise in fluorescence measurement can be further reduced.

In addition, the biochip reading device 1 of the present embodiment includes the excitation optical system 12 configured to irradiate the sites 114 of the biochip 110 of the present embodiment with excitation light, and the imaging optical system 13 configured to condense fluorescence emitted from the sites 114 to the lens to image the fluorescence. According to the biochip reading device 1, stray light and crosstalk for fluorescence of an adjacent site 114 are reduced in the biochip 110 of the present embodiment described above. Thus, the optical noise in fluorescence measurement can be reduced.

Moreover, in the biochip reading device 1 of the present embodiment, the aperture angle θ2 of the microlens 112 on the fluorescence incident side is greater than the aperture angle θ3 of the microlens 112 on the fluorescence emission side. Fluorescence with the aperture angle θ3 of the microlens on the emission side is received with the aperture angle θ5 of the first lens. As a result, the microlens 112 can condense fluorescence of each site 114 with the aperture angle θ2 wider than the aperture angle θ5 of the first lens 131a. Thus, the measured light amount can be further increased, and the accuracy of fluorescence measurement can be further enhanced.

Next, a biochip manufacturing method for manufacturing the biochip 110 will be described.

Figure 6:
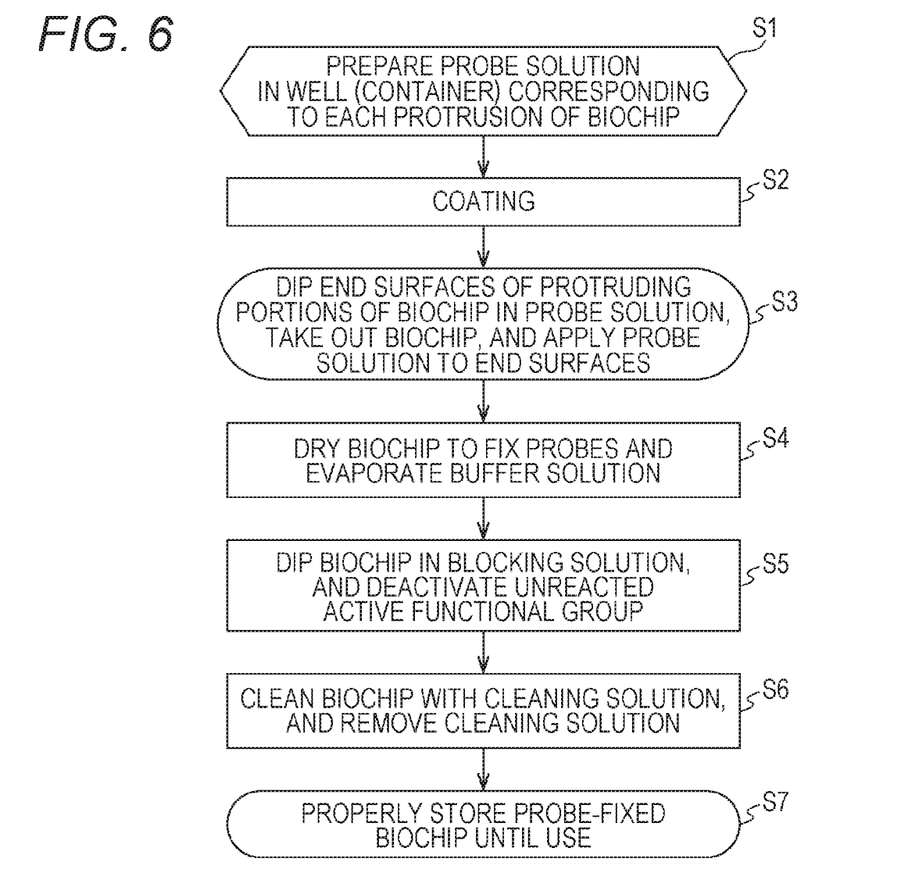
FIG. 6 is a flowchart of a biochip manufacturing method for manufacturing the biochip illustrated in FIGS. 1 to 4.
Figure 7:
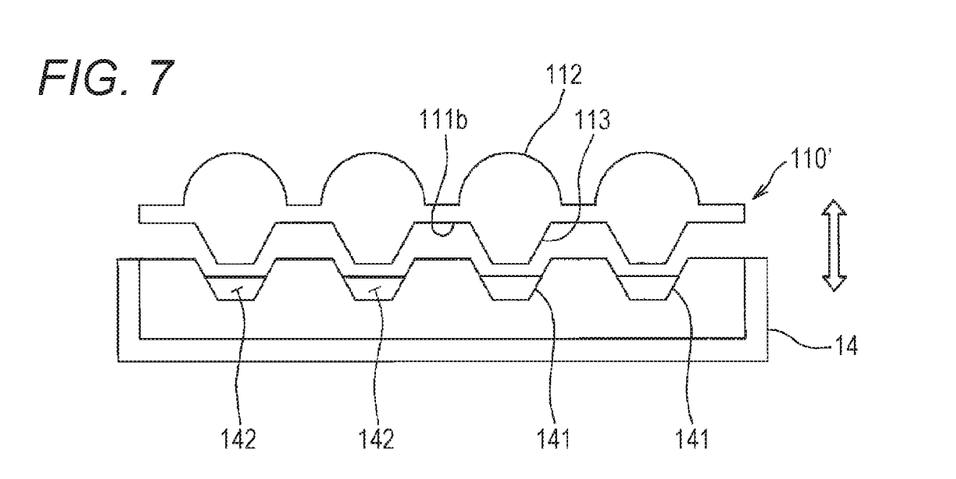
FIG. 7 is a schematic view of the biochip manufacturing method illustrated in the flowchart of FIG. 6.

FIG. 6 is a flowchart of the biochip manufacturing method for manufacturing the biochip illustrated in FIGS. 1 to 4. Moreover, FIG. 7 is a schematic view of the biochip manufacturing method illustrated in the flowchart of FIG. 6.

In the biochip manufacturing method of the present embodiment, the step of forming DNA hybridization as the molecular reaction and forming a reaction DNA probe as the site is described. First, a well container 14 having multiple recessed portions 141 formed corresponding one-to-one with protruding portions 113 of a biochip 110' before formation of sites 114 is prepared. Then, a probe solution 142 for a molecular reaction DNA probe for forming the site 114 is injected into each recessed portion 141 of the well container 14 (a step S1). Next, by surface treatment for a second surface 111b of the biochip 110' including the protruding portions 113 before formation of the sites 114, the coating step (a step S2) of forming an active functional group for fixing the probes of the probe solution 142 is performed.

Then, the protruding portions 113 each enter the recessed portions 141 of the well container 14. After top portions of the protruding portions 113 have been dipped in the probe solution 142, these top portions are drawn up, and therefore, the application step (a step S3) of applying the probe solution 142 to the top portions is performed. In the present embodiment, the application step (the step S3) is performed under high-humidity conditions for preventing drying in the middle.

Subsequent to the application step (the step S3), the drying step (a step S4) of drying the biochip 110 to evaporate a buffer solution of the probe solution 142 to fix the probes to the top portions of the protruding portions 113 and form the sites 114 is performed. In the present embodiment, at the drying step (the step S4), incubation is performed at 80° C. for one hour for progressing a probe binding reaction.

After the drying step (the step S4), the following blocking step (a step S5) is performed. At the blocking step (the step S5), the second surface 111b including the protruding portions 113 is dipped in a blocking solution for deactivating the active functional group for five minutes. By such dipping, blocking agent molecules of the blocking solution are bound to an unreacted active functional group at other spots than site formation spots to deactivate the active functional group.

Next, the cleaning step (a step S6) of cleaning the blocking solution of the biochip 110 with a cleaning solution is performed. At the cleaning step (the step S6), the biochip 110 is, without drying in the middle, dipped in each of hot water and cold water for two minutes, and is taken out. Then, remaining water droplets are removed by, e.g., an air duster.

Lastly, the biochip 110 provided with the sites 114 by probe fixing is stored as necessary until use, and the biochip manufacturing method ends (a step S7).

According to the biochip manufacturing method of the present embodiment described above, in the manufactured biochip 110 of the present embodiment, stray light and crosstalk for fluorescence of an adjacent site 114 are reduced. Thus, the optical noise in fluorescence measurement can be reduced. Moreover, according to the biochip manufacturing method of the present embodiment, the protruding portions 113 each enter the recessed portions 141 of the well container 14 so that the multiple sites 114 can be formed at once at accurate formation positions. Thus, the high-accuracy biochip 110 can be easily manufactured at low cost as compared to a typical manufacturing method in which a spot device with a pin or an inkjet is, for example, used to apply a probe solution to spots on a transparent substrate one by one.

Moreover, in the biochip manufacturing method of the present embodiment, the coating step (the step S2) of forming the active functional group by the surface treatment for the second surface 111b including the protruding portions 113 is performed in advance of the application step (the step S3). By such formation of the active functional group, the probe can be fixed to the top portion of each protruding portion 113 with high accuracy to form the site 114. Thus, the higher-accuracy biochip 110 can be manufactured.

Further, in the biochip manufacturing method of the present embodiment, the blocking step (the step S5) of dipping the second surface 111b including the protruding portions 113 in the blocking solution is performed after the drying step (the step S4). As a result, the unreacted active functional group at other spots than the formation spots of the sites 114 is deactivated. Thus, the higher-accuracy biochip 110 configured such that, e.g., occurrence of unnecessary fluorescence at other spots than the formation spots of the sites 114 is reduced can be manufactured.

Note that a representative form of the present invention has been merely described above as the embodiment, and the present invention is not limited to this embodiment. That is, various modifications can be made without departing from the gist of the present invention. These modifications are, needless to say, included in the scope of the present invention as long as the configurations of the biochip, the biochip unit, the biochip reading device, and the biochip manufacturing method in the present invention are provided.

For example, in the above-described embodiment, the protruding portion 113 in the frusto-conical shape has been described as one example of the protruding portion of the present invention, but the protruding portion of the present invention is not limited to above. The specific shape of the protruding portion of the present invention is not limited as long as the protruding portions are those formed corresponding one-to-one with the microlenses on the second surface of the transparent substrate.

Moreover, in the above-described embodiment, the protruding portion 113 made of the transparent material in the frusto-conical shape has been described as one example of the protruding portion of the present invention, but the protruding portion of the present invention is not limited to above. The protruding portion of the present invention may be one of which outer surface is mirror-coated with, e.g., a metal film or a dielectric multi-layer.

Further, in the above-described embodiment, the microlens 112 as the hemispherical spherical lens has been described as one example of the microlens of the present invention, but the microlens of the present invention is not limited to above. The microlens of the present invention may be, for example, other spherical lenses than the hemispherical lens, a non-spherical lens, or a Fresnel lens.

In addition, in the above-described embodiment, the numerical aperture NA1 of the microlens of the present invention has been described as an example, but the microlens of the present invention is not limited to above. The numerical aperture may be designed as necessary according to usage conditions. The same applies to the numerical aperture of the first lens 131a as one example of the chip-side lens of the present invention.

Moreover, in the above-described embodiment, the excitation optical system 12 and the imaging optical system 13 having the dichroic mirror 123 as a common optical element have been described as one example of the excitation optical system and the imaging optical system of the present invention. However, the excitation optical system and the imaging optical system of the present invention are not limited to above, and may be individual optical systems. Further, a specific optical configuration such as lens arrangement and the number of lenses are not limited to those of the configuration described as an example in the present embodiment, and may be designed as necessary.

LIST OF REFERENCE NUMERALS 1 biochip reading device
11 biochip unit
12 excitation optical system
13 imaging optical system
14 well container
110 biochip
111 transparent substrate
111a first surface
111b second surface
112 microlens
112a optional axis
113 protruding portion
114 site
115 support container
116 sample solution
121 light source
122 excitation lens
123 dichroic mirror
131 relay lens
131a first lens
131b second lens
132 imaging camera
133 barrier filter
L1 line θ1 conical angle
θ2, θ3, θ5 aperture angle
θ4 angle

The invention claimed is:

1. A biochip for fluorescence measurement, the biochip comprising:
a transparent substrate;
multiple microlenses formed in an array on a first surface of the transparent substrate;
multiple protruding portions formed on a second surface of the transparent substrate opposite to the first surface, the multiple protruding portions corresponding one-to-one with the multiple microlenses and extending away from the multiple microlenses; and
a fluorescence measurement site formed at a top portion of each protruding portion,
wherein the transparent substrate, the multiple microlenses and the multiple protruding portions are integrally made of glass, silicon, a single crystal, transparent ceramics, or a resin material.

2. The biochip according to claim 1, wherein
in a plane including an optical axis of one of the microlenses most adjacent to an optical axis of another one of the microlenses facing an optional one of the sites, a conical angle of a side surface of each protruding portion is smaller than an angle between a line connecting, with a shortest distance, an end portion of the site and a boundary between the most adjacent microlens and a flat surface of the first surface and the optical axis of the another one of the microlenses facing the optional one of the sites.

3. A biochip unit comprising:
a biochip for fluorescence measurement; and
a biochip support container,
wherein the biochip is the biochip according to claim 1, and
the biochip support container hermetically seals the second surface of the transparent substrate together with the multiple sites, and a sample solution for fluorescence measurement is sealed in the biochip support container such that the sites are dipped in the sample solution.

4. The biochip unit according to claim 3, wherein
the sample solution is a black solution.

5. A biochip reading device including a biochip for fluorescence measurement and provided for reading fluorescence from the biochip, the biochip being the biochip according to claim 1, the biochip reading device comprising:
an excitation optical system configured to irradiate the sites of the biochip with excitation light from a microlens side; and
an imaging optical system configured to condense fluorescence emitted from each site and having passed through each microlens by a photo-receiving optical system to image the fluorescence by a photo-receiving element.

6. The biochip reading device according to claim 5, wherein
an aperture angle of each microlens on the photo-receiving optical system side is greater than an aperture angle of the photo-receiving optical system on a biochip side.

7. A biochip manufacturing method for manufacturing a biochip for fluorescence measurement, the biochip being the biochip according to claim 1, the biochip manufacturing method comprising:
an application step of preparing a well container configured such that a probe solution for forming the sites is accumulated in each of multiple recessed portions arranged facing the second surface of the transparent substrate and formed corresponding one-to-one with the protruding portions and applying the probe solution to the top portions of the protruding portions in such a manner that the protruding portions each enter the recessed portions of the well container and the top portions are drawn up after having been dipped in the probe solution; and a drying step of drying the protruding portions having the top portions to which the probe solution has been applied to fix probes of the probe solution to the top portions and form the sites.

8. The biochip manufacturing method according to claim 7, wherein a coating step of forming an active functional group for fixing the probes by surface treatment for the second surface including the protruding portions is performed in advance of the application step.

9. The biochip manufacturing method according to claim 8, wherein a blocking step of dipping the second surface including the protruding portions in a blocking solution for deactivating the active functional group to deactivate an unreacted active functional group at other spots than site formation spots is performed after the drying step.

10. A biochip for fluorescence measurement, comprising:
a transparent substrate;
multiple microlenses formed in an array on a first surface of the transparent substrate;
multiple protruding portions formed corresponding one-to-one with the microlenses on a second surface of the transparent substrate; and
a fluorescence measurement site formed at a top portion of each protruding portion,
wherein
a conical angle of a side surface of each protruding portion is equal to or greater than an aperture angle of each microlens.

11. A biochip for fluorescence measurement, the biochip comprising:
a transparent substrate;
multiple microlenses formed in an array on a first surface of the transparent substrate;
multiple protruding portions formed corresponding one-to-one with the microlenses on a second surface of the transparent substrate; and
a fluorescence measurement site formed at a top portion of each protruding portion,
wherein
a side surface of each protruding portion totally reflects at least part of fluorescence emitted from the site and passing through an inside of each protruding portion toward each microlens.

* * * * *